(12) United States Patent (10) Patent No.: US 8,775,802 B1
Kargman et al. (45) Date of Patent: *Jul. 8, 2014

(54) COMPUTER SECURITY SYSTEM AND METHOD

(71) Applicant: Secure Vector, Chicago, IL (US)

(72) Inventors: James B. Kargman, Chicago, IL (US); Peter Scott, Boulder, CO (US); Jeffrey Bromberger, Omaha, NE (US)

(73) Assignee: Secure Vector, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,447

(22) Filed: Apr. 22, 2013

Related U.S. Application Data

(63) Continuation-in-part of application No. 12/911,184, filed on Oct. 25, 2010, now Pat. No. 8,429,429.

(60) Provisional application No. 61/254,432, filed on Oct. 23, 2009.

(51) Int. Cl.
*G06F 21/00* (2013.01)
(52) U.S. Cl.
USPC .......................................................... 713/166
(58) Field of Classification Search
USPC ............................... 726/26–34; 713/150–181
See application file for complete search history.

(56) References Cited

U.S. PATENT DOCUMENTS

| | | | |
|---|---|---|---|
| 5,317,717 A | 5/1994 | Cutler et al. | |
| 6,279,111 B1 | 8/2001 | Jensenworth et al. | |
| 6,349,355 B1 | 2/2002 | Draves et al. | |
| 6,507,904 B1 | 1/2003 | Ellison et al. | |
| 6,633,963 B1 | 10/2003 | Ellison et al. | |
| 6,678,825 B1 | 1/2004 | Ellison et al. | |
| 6,754,815 B1 | 6/2004 | Ellison et al. | |
| 6,760,441 B1 | 7/2004 | Ellison et al. | |
| 6,934,817 B2 | 8/2005 | Ellison et al. | |
| 6,941,458 B1 | 9/2005 | Ellison et al. | |
| 6,957,332 B1 | 10/2005 | Ellison et al. | |

(Continued)

OTHER PUBLICATIONS

Kelley, "Introduction to Registry Filtering in Vista (Part I)," The NT Insider, vol. 15(1), pp. 1-8, retrieved from internet website: http://www.osronline.com/article.cfm?article=517 (May 28, 2008).

(Continued)

*Primary Examiner* — Carl Colin
*Assistant Examiner* — Don Zhao
(74) *Attorney, Agent, or Firm* — Drinker Biddle & Reath LLP

(57) ABSTRACT

A method is provided for protecting a computer system, comprising creating an isolated process, then assigning a first process group to the process; creating an additional group process within the first process group; performing a first determination by an application programming interface (API) that the additional group process is within the first process group, and as a result of the first determination, causing the additional group process to inherit and duplicate a handle of the process. Process communications and control within isolated groups is permitted freely, whereas process control by an isolated process for non-isolated processes or isolated processes in different groups is constrained or prohibited.

12 Claims, 6 Drawing Sheets

(56) References Cited

U.S. PATENT DOCUMENTS

| | | | |
|---|---|---|---|
| 7,137,004 | B2 | 11/2006 | England et al. |
| 7,392,541 | B2 | 6/2008 | Largman et al. |
| 7,398,532 | B1 | 7/2008 | Barber et al. |
| 7,506,170 | B2 | 3/2009 | Finnegan |
| 7,665,143 | B2 | 2/2010 | Havens et al. |
| 7,809,957 | B2 | 10/2010 | Grawrock |
| 8,024,815 | B2 | 9/2011 | Lorch et al. |
| 8,099,596 | B1 | 1/2012 | Rusakov et al. |
| 8,225,404 | B2 | 7/2012 | Freericks et al. |
| 2001/0037450 | A1 | 11/2001 | Metlitski et al. |
| 2003/0159070 | A1 | 8/2003 | Mayer et al. |
| 2004/0078590 | A1 | 4/2004 | Ellison et al. |
| 2004/0093506 | A1 | 5/2004 | Grawrock et al. |
| 2005/0229250 | A1 | 10/2005 | Ring et al. |
| 2006/0259487 | A1* | 11/2006 | Havens et al. .................. 707/9 |
| 2006/0282606 | A1 | 12/2006 | Radhakrishnan et al. |
| 2007/0079090 | A1 | 4/2007 | Rajagopal et al. |
| 2008/0250400 | A1 | 10/2008 | Vertes |
| 2010/0024036 | A1 | 1/2010 | Morozov et al. |
| 2010/0057774 | A1 | 3/2010 | Pizano et al. |

OTHER PUBLICATIONS

Liang et al., "Isolated Program Execution: An Application Transparent Approach for Executing Untrusted Programs," Proceedings, 19th Annual Computer Security Applications Conference, 2003, pp. 182-191 (2003).

Wikipedia, "Kernel Parch Protection," Wikipedia, the free encyclopedia, pp. 1-8, retrieved from internet website: http://en.wikipedia.org/wiki/Kernel_Patch_Protection (retrieved on Oct. 13, 2010).

Wikipedia, "Sandbox (computer security)," Wikipedia, the free encyclopedia, pp. 1-2, retrieved from internet website: http://en.wikipedia.org/wiki/Sandbox_(computer_security) (retrieved on Apr. 5, 2010).

WMware, "Secure your Cloud with Virtualization-aware Security," VMware vShield™ Product Family, p. 1, retrieved from internet website: http://www.vmware.com/products/vshield (retrieved on Oct. 13, 2010).

* cited by examiner

COMPUTER SECURITY SYSTEM AND METHOD

CROSS REFERENCE TO RELATED APPLICATIONS

The present application is a continuation-in-part of parent application Ser. No. 12/911,184, filed Oct. 25, 2010, now U.S. Pat. No. 8,429,429, entitled, "A COMPUTER SECURITY SYSTEM AND METHOD", which claims the benefit of U.S. Provisional Application No. 61/254,432, filed Oct. 23, 2009, entitled, "A COMPUTER SECURITY SYSTEM AND METHOD", both of which are herein incorporated by reference.

BACKGROUND

Computer security is becoming an increasingly important issue as more and more reliance is placed on computers to manage important information. The increasing threat of viruses has required that systems provide adequate protection against both known and unknown threats.

The present system and method for providing computer security relate primarily to the Microsoft Windows®-based operating system platforms, including, but not limited to, Windows XP,® Windows Vista,® Windows 7,® Windows 8,® Windows Server 2008,® Windows Server 2012,®which are tied to the Intel,® Itanium,® and AMD® processors with an Intel 8086®-based or RISC-based instruction set, register, and memory configurations. The present system and method particularly relate to both the 32-bit and the 64-bit versions of these operating systems in which more robust features are provided. However, the principles established herein are do not specifically require Windows or the specific hardware platforms noted above, and the invention is not to be construed as so limiting. Numerous other embodiments are contemplated.

In the 32-bit Windows architectures, an application running in user-mode can chain (patch) into a system call table via a known user-mode application program interface (API). The problem with this approach is that a malicious application can chain into the system call table and from there easily infect almost any part of the system.

In the 64-bit version of Windows, a feature called the Kernel Patch Protection (KPP), (informally known as "Patch-Guard") was implemented that does not allow alteration of the operating system code itself, making the system more secure and less vulnerable to malicious code. However, since some useful programs rely on patching the OS in order to work properly, these applications do not work on the 64-bit version.

For both the 32-bit and the 64-bit versions of Windows, anti-virus and anti-spyware software is needed, since it is possible to install programs that can give an attacker access to, and control over, the system, merely by clicking on a link in an e-mail or by visiting a malicious website containing malware.

Conventional anti-virus and anti-malware software relies on signatures, or specific attributes of malware to detect viruses and malware and to defend against them. Such signatures could be, e.g., a specific series of instructions or a data field that is consistent across copies of the virus payload. However, new so-called "polymorphic" and automatically self-modifying malware can get around these protections by changing their signature dynamically. Criminal enterprises have formed and are currently using these techniques to invade Windows-based systems and steal passwords and account information; in some cases such techniques have been used to steal hundreds of thousands of dollars using online banking credentials that were stolen.

Furthermore, the zero-day problem also negates signature-based anti-virus and anti-malware solutions. The zero-day problem is the day on which a virus or malicious software is first introduced into the general population. On the first day, no analysis has been performed on the threat and no potential signatures have been identified and provided in the anti-virus program databases.

Previous attempts to protect against this sort of malware have been based on a separate area of memory or physical disk where all changes to the system are recorded and mapped to the "actual" files, so that changes are not committed to the actual system files, but rather the temporary image of those files. However, these systems have significant limitations in their ability to function, and some cannot function at all on the 64-bit platform because of their reliance on using routines that can be considered security risks.

What is needed is a kernel-mode product for both 32-bit and 64-bit Windows platforms which allows users to selectively isolate processes from sensitive areas in the operating system. The important components that are protected through isolation may include the file system, the system registry, named pipe and mail slot access, socket-based connections, and port-communications.

Port based accesses may be filtered for isolated processes. The actions which isolated processes can perform over these ports, such as asking the caller about the connections, not registering any ports which can be used for call back from the outside, etc. can be provided as well.

SUMMARY

The following acronyms are used in this application.
Table of Acronyms
    ACE Access Control Entry (a Microsoft-defined protection mechanism)
    AMD Advanced Micro Devices (company)
    API application program interface
    CM configuration manager
    DACL discretionary access control list
    FAT file allocation table (older file system for Microsoft Windows)
    FS file system
    FSD file system driver
    GUID globally unique identifier
    IO or I/O input/output
    KPP Kernel Patch Protection (Microsoft Windows 64-bit version feature, informally known as "PatchGuard")
    LPC local procedure call
    MSDN Microsoft Developer's Network
    NPFS named pipe file system
    NTFS (Windows) NT file system
    PDF Portable Document Format (defined by Adobe)
    RAM random-access memory
    RFM Registry Filtering Model (defined by Microsoft Windows)
    RISC reduced instruction set computer
    ROM read-only memory
    RPC remote procedure call
    SSDT System Service Descriptor Table (defined by Microsoft Windows)

Based on the above background discussion, and in accordance with various embodiments of the invention discussed in more detail below, a method is provided for protecting a computer system, comprising: attaching a security descriptor to a process running on a processor of the computer system that has been previously started; associating with the security descriptor an isolation indicator that, by itself, indicates the process is to run in an isolation mode, thereby rendering it as an isolated process, the isolated process running with non-isolated processes in a common environment; calling a kernel routine by the isolated process that is also callable by a process that is not running in isolation mode; attempting to write to an object of a disk or a registry by the kernel routine called by the isolated process; determining, by a filter driver running in kernel mode, whether the kernel routine is requesting the write on behalf of the isolated process or a non-isolated process; if the write is requested on behalf of the isolated process, then performing the write in a pseudo storage area; and if the write is requested on behalf of the non-isolated process, then performing the write in an actual storage area in which the disk, registry, or other actual system or process data resides; wherein if the requested write is a first object write, then copying the object from the actual storage area to the pseudo storage area; assigning a first process group to the process; creating an additional group process within the first process group; performing a first determination by an application programming interface (API) that the additional group process is within the first process group, and as a result of the first determination, causing the additional group process to inherit and duplicate a handle of the process.

A method is also provided for protecting a computer system, comprising: attaching a security descriptor to a process running on a processor of the computer system that has been previously started; associating with the security descriptor an isolation indicator that, by itself, indicates the process is to run in an isolation mode, thereby rendering it as an isolated process, the isolated process running with non-isolated processes in a common environment; calling a kernel routine by the isolated process that is also callable by a process that is not running in isolation mode; attempting to write to an object of a disk or a registry by the kernel routine called by the isolated process; determining, by a filter driver running in kernel mode, whether the kernel routine is requesting the write on behalf of the isolated process or a non-isolated process; if the write is requested on behalf of the isolated process, then performing the write in a pseudo storage area; and if the write is requested on behalf of the non-isolated process, then performing the write in an actual storage area in which the disk, registry, or other actual system or process data resides; wherein if the requested write is a first object write, then copying the object from the actual storage area to the pseudo storage area; utilizing a communication element that allows inter-process communication between the process and an other process within a first process group, but blocks inter-process communication between the process and a further process that is not within the first process group.

Finally, a method is provided for protecting a computer system, comprising: attaching a security descriptor to a process running on a processor of the computer system that has been previously started; associating with the security descriptor an isolation indicator that, by itself, indicates the process is to run in an isolation mode, thereby rendering it as an isolated process, the isolated process running with non-isolated processes in a common environment; calling a kernel routine by the isolated process that is also callable by a process that is not running in isolation mode; attempting to write to an object of a disk or a registry by the kernel routine called by the isolated process; determining, by a filter driver running in kernel mode, whether the kernel routine is requesting the write on behalf of the isolated process or a non-isolated process; if the write is requested on behalf of the isolated process, then performing the write in a pseudo storage area; and if the write is requested on behalf of the non-isolated process, then performing the write in an actual storage area in which the disk, registry, or other actual system or process data resides; wherein if the requested write is a first object write, then copying the object from the actual storage area to the pseudo storage area; providing a user mode library for patching import and export tables for isolated process groups to control isolated processes from performing calls into system application program interface routines that could allow the isolated processes from modifying, controlling, or terminating a non-isolated process or a process from a different process group.

DESCRIPTION OF THE DRAWINGS

Various embodiments of the invention are illustrated in the Figures and following descriptive text.

DETAILED DESCRIPTION

The security system and method are implemented by software algorithms that run on a computer system to be protected. Various embodiments of the invention are described below.

Figure 1:
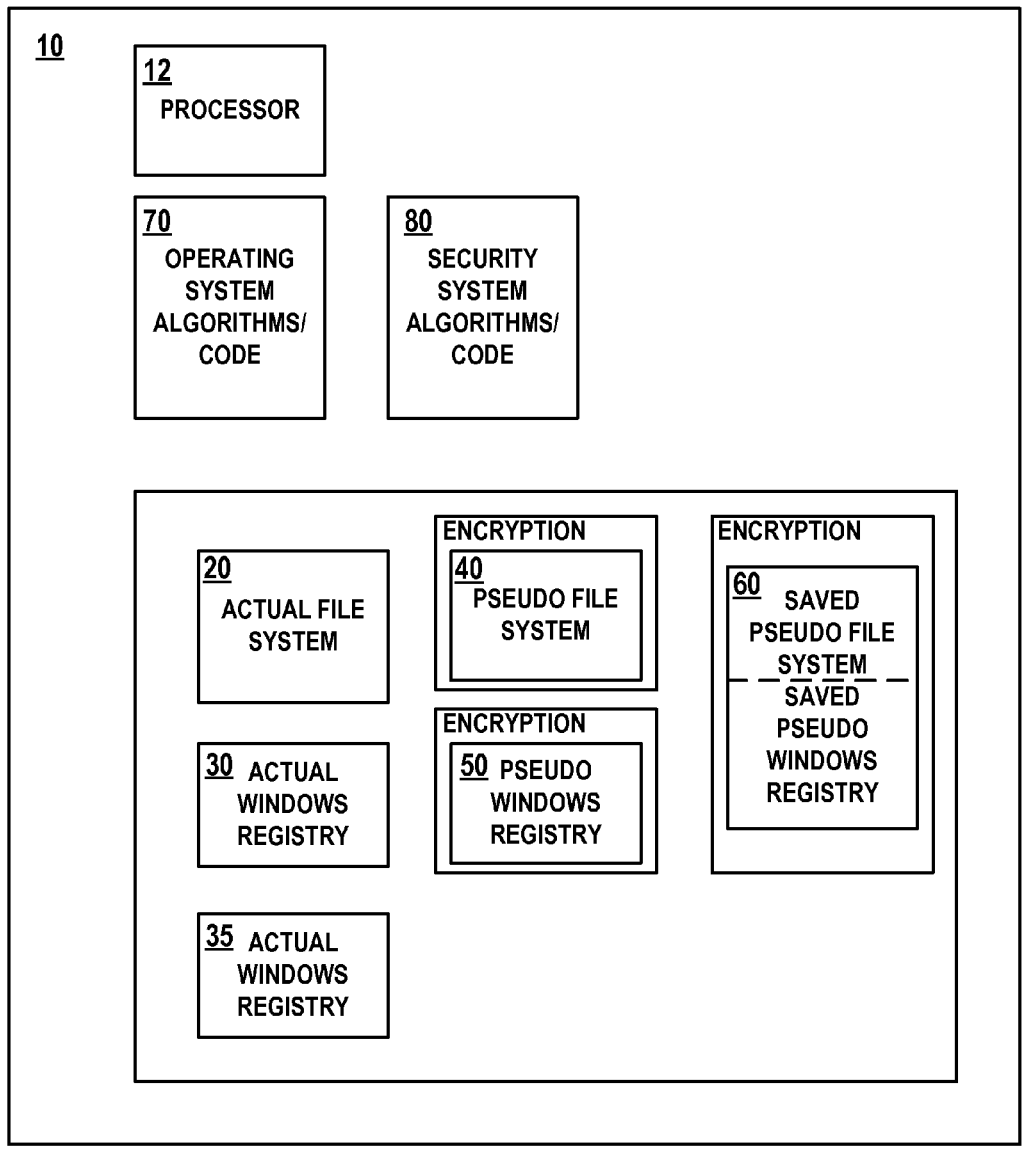
FIG. 1 is a block diagram illustrating the primary components of the system.

FIG. 1 is a block diagram of a computer system 10 on which the security system software is run. The computer system 10 may comprise elements typical of a computer, such as volatile and non-volatile memory, storage devices, such as hard drives, communications and network hardware/software, user interface devices, such as a display, keyboard, mouse, etc.

The computer 10 has an actual file system 20 that is provided on a non-volatile storage device, such as a hard drive or non-volatile writable memory. The file system 20 also includes the necessary hardware and software (as part of the operating system code 70) for providing organized read and write access of information typically organized into files and directories. In the Microsoft Windows operating system, an actual Windows Registry 30 is provided that is used to store important system information.

On operating systems that do not use a form of registry, the discussion below related to the registry can be ignored, although any equivalent functionality implemented through the file system would still be applicable.

As described in more detail below, the security system code 80 distinguishes between processes that are to run normally 90 and those that are to run in an isolated mode (isolated processes) 95. Isolated processes 95 will generally interact with a pseudo (or shadow) file system 40 and a pseudo windows registry 50 unless read only access is used by the process 95. The a pseudo file system 40 and a pseudo windows registry 50 are preferably implemented on the non-volatile storage medium of the computer 10, but could also be implemented in volatile memory as well, although with many large file accesses, the amount of available volatile memory may be limiting. The data created with an isolated process 95 may be stored in a saved pseudo file system and saved pseudo windows registry 60 so that it can be further utilized by a later instance of the isolated process 95.

When the security software 80 is first installed on a computer, a list of executable file names and/or processes that are to be isolated 35 are loaded into the Windows Registry 30 (or possibly in a system file). This list identifies applications and process names that may result in compromised data and executable files to be loaded onto the computer 10. An example would be web browser software, such as Microsoft's Internet Explorer or Mozilla's Firefox. The list can be easily updated manually or automatically so that the code 80 can modify the processes that it treats as isolated processes. This list could vary depending on the username or a user/group attribute. For example, a user with administrative privileges on the computer 10 might be able to run the browser with write access to the actual file system 20, whereas a non-privileged user may be restricted as described herein. Or, the isolation could be provided for all process of a particular user or user/group attribute. The system software 80, in the form of a driver, then subsequently reads this list when the driver is loaded.

An isolated process is allowed read-only access to the actual file system 20 and registry 30, however any changes that it attempts to make are redirected to the pseudo file system 40 and registry 50.

FIGS. 2A-D illustrate various steps that are used for process creation 100, process read/write 200, and process termination 300.

Figure 2A:
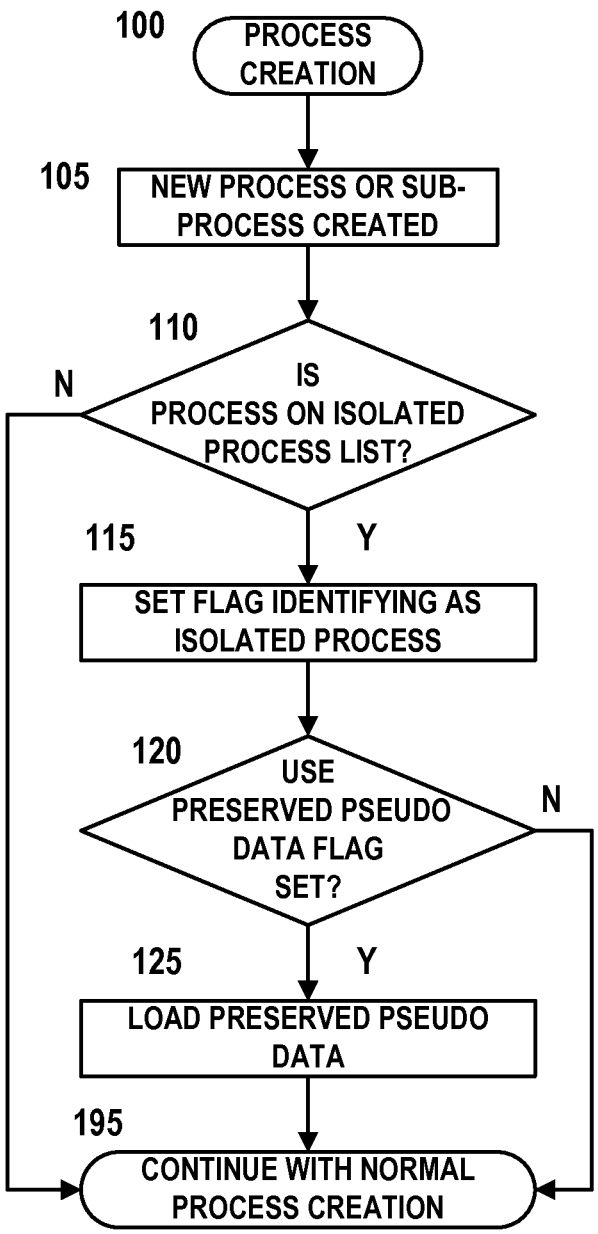
FIG. 2A is a flowchart illustrating a method for process creation.

FIG. 2A illustrates process creation 100. In the following example, Microsoft's Internet Explorer, a web browser ("browser"), is used as an exemplary process that is to be isolated—however, it should be understood that the process can be used for any application.

When a user initiates a browser instance, the operating system creates a new instance of a browser process iexplore-.exe 105. The software 80 has a process creation callback, so whenever a new process gets created on the system, the software 80 callback gets called, indicating that a new process is being created, the process ID, and the fact that it is a new process that's getting created.

The software 80 checks to see 110 if this process "iexplore-.exe" is on the isolated process list 35. If it's not, the system continues on with the normal process creation routines 195. If it is, then the system sets a flag identifying this instance of the process as an isolated process 115. A data structure is created that indicates this as an isolated process Information about the location of the pseudo file system and registry is obtained at this point. The root location of these items are known ahead of time but a unique index value is assigned to the process group and that is the unique starting point for the pseudo file system and directory. By way of example (refer to FIG. 3, discussed in more detail below), process group 1 300 may have a pseudo file system 340 located at c:\User\Pete\VectorShield\Group1, whereas process group 2 400 may have a pseudo file system 440 starting at c:\User\Pete\VectorShield\Group2. In this way, multiple groups 300, 400 can be running in parallel and not interfere with each other.

In addition, if the process being created is a sub-process of an isolated process, the sub process is also flagged as an isolated process, since a sub-process of an isolated process should be subject to the same write restrictions of the isolated process. The detection of processes within an isolated process group may use the Microsoft's Access Control Entry (ACE) inheritance model (see MSDN (Microsoft Developer's Network) Library, Access Control Model, (and associated subchapters) build date Sep. 30, 2010).

For system processes which perform work on behalf of an isolated process, a special discretionary access control list (DACL) may be attached to a token of the isolated process. The DACL is an access control list that is controlled by the owner of an object and that specifies the access particular users or groups can have to the object. The isolated object's token can be passed through the system and provides an identifiable flag to the filter driver that a particular server request should in fact be isolated.

Figure 3:
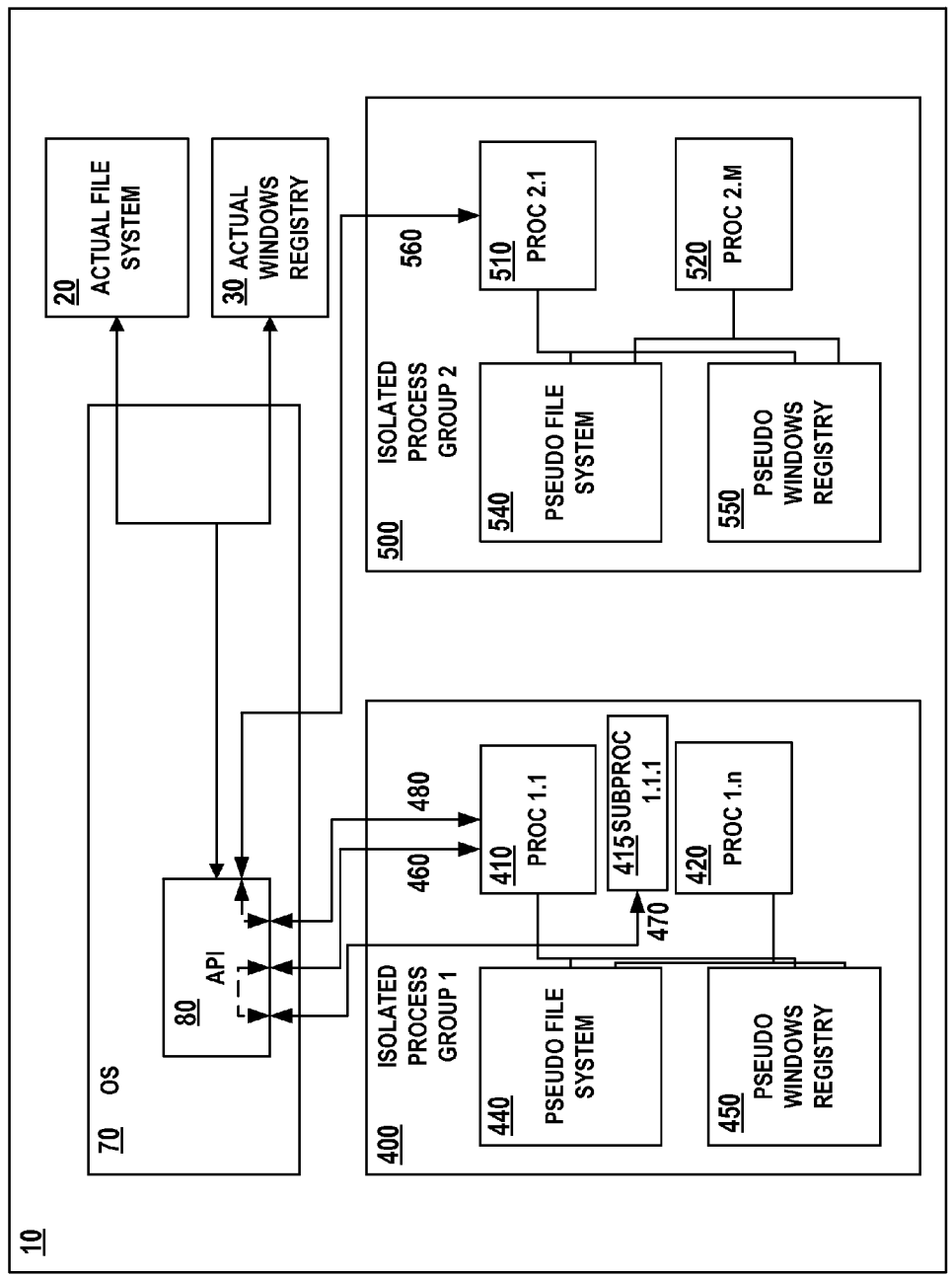
FIG. 3 is a block diagram illustrating a system with two isolated process groups.

A handle duplication and inheritance subsystem within the system may be filtered by registering with system APIs. Isolated processes can be organized into process groups. Referring to FIG. 3, isolated process group 1 400 comprises a number of processes: process 1.1 410, and process 1.n 420. Furthermore, a subprocess 1.1.1 415 may be created by process 1.1 410. Similarly, isolated process group 2 500 comprises a number of processes: process 2.1 410, and process 2.m 520. Processes 410, 415, and 420 in process group 1 400 can read and write from a pseudo file system 440 and pseudo Windows registry 450, and processes 510 and 520 in process group 2 500 can read and write from a pseudo file system 540 and pseudo Windows registry 550.

Handle inheritance and duplication within an isolated process group (e.g., within group 1 400) is supported and allowed. In FIG. 3, a process 1.1 410 creating a subprocess 1.1.1 415 can call 460 an API 80 of the operating system 70 that permits the inheritance and duplication of the handle 470. The API 80 is aware that the process 1.1 410 is in the same process group 400 as the subprocess 1.1.1 415. Although the within-group handle inheritance and duplication are described above with regard to a process and subprocess, it works in a similar manner between processes at the same level (e.g., proc. 1.1 and proc 1.n).

In contrast, handle inheritance and duplication across an isolated process group boundary (e.g., between group 1 400 and group 2 500) is adjusted via the API 80 480, 560 to remove any access which could allow an isolated process to modify, control, or terminate a non-isolated processes memory or functionality.

The handle inheritance and duplication filtering is performed on a per process and per thread basis to eliminate any possibility that an isolated process group can modify, control or terminate a process or thread which is not isolated. Handle inheritance and duplication from non-isolated process groups modifying an isolated process groups process or thread is also restricted in the same manner described above.

Registry isolation may be similarly implemented through a registry filter driver. This filter, like the file system filter, may use a token-based technique to recognize system processes which are operating on behalf of an isolated process. All modifications made by an isolated process are redirected so that no changes to the real registry can be made from within an isolated process.

In one embodiment, a user may have decided to preserve the pseudo data from a previous session. In this case, if a flag is set, the software 80 then loads 125 the preserved pseudo data 60 into the pseudo file system 40 and registry 50. Then, normal process creation is carried out 195. Alternately, a similar operation could take place not with data preserved from a previous session, but from pre-canned data associated with a particular process to be isolated. For example, it may be desirable to have a browser with pre-canned PDF viewing software already present so that the user does not have to download it even the first time. It is preferable that each process group has its own pseudo file system and registry storage so that they cannot overlap.

Figure 2B:
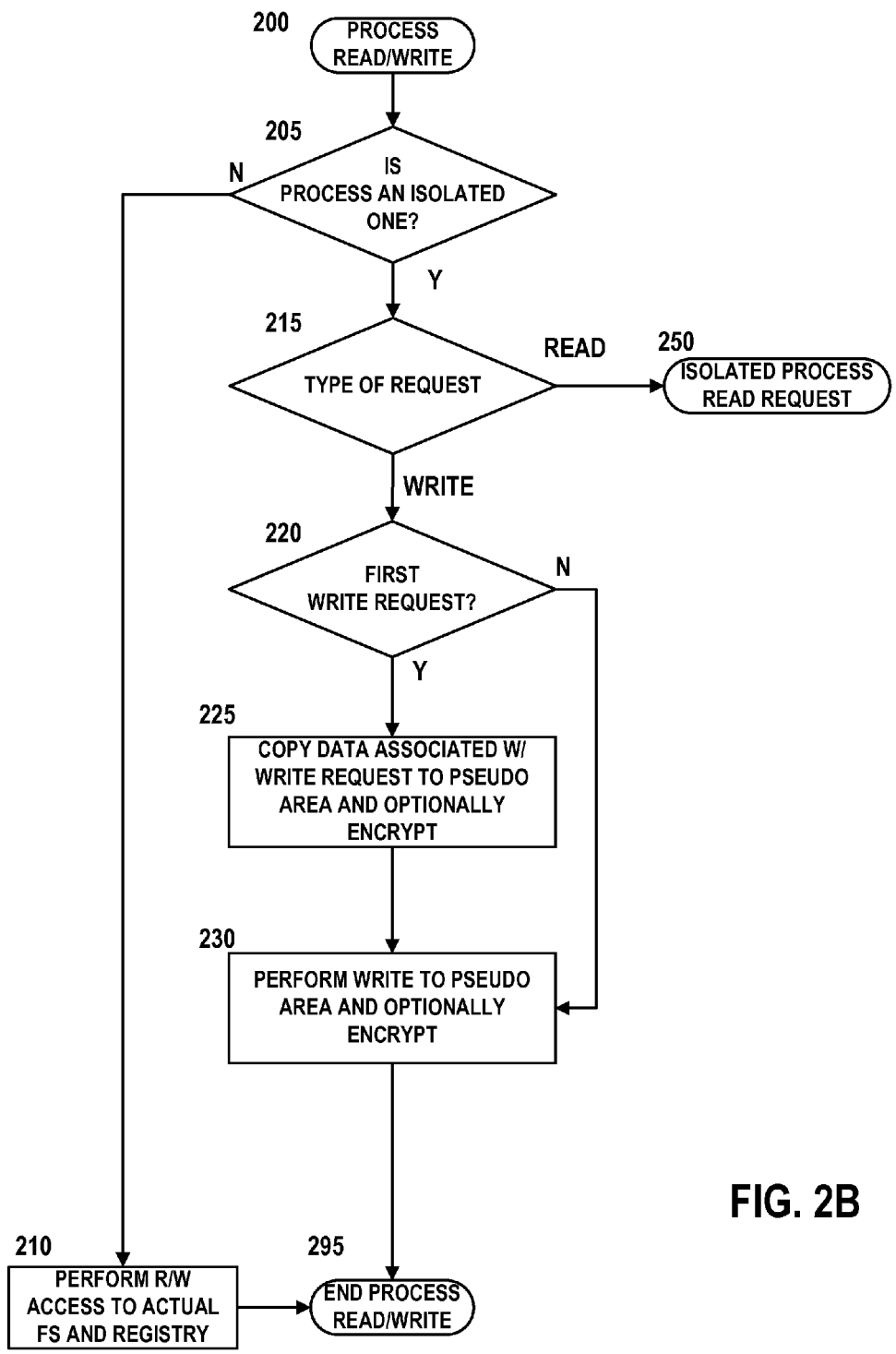
FIGS. 2B &C are a flowchart illustrating a method for process reading and writing.
Figure 2C:
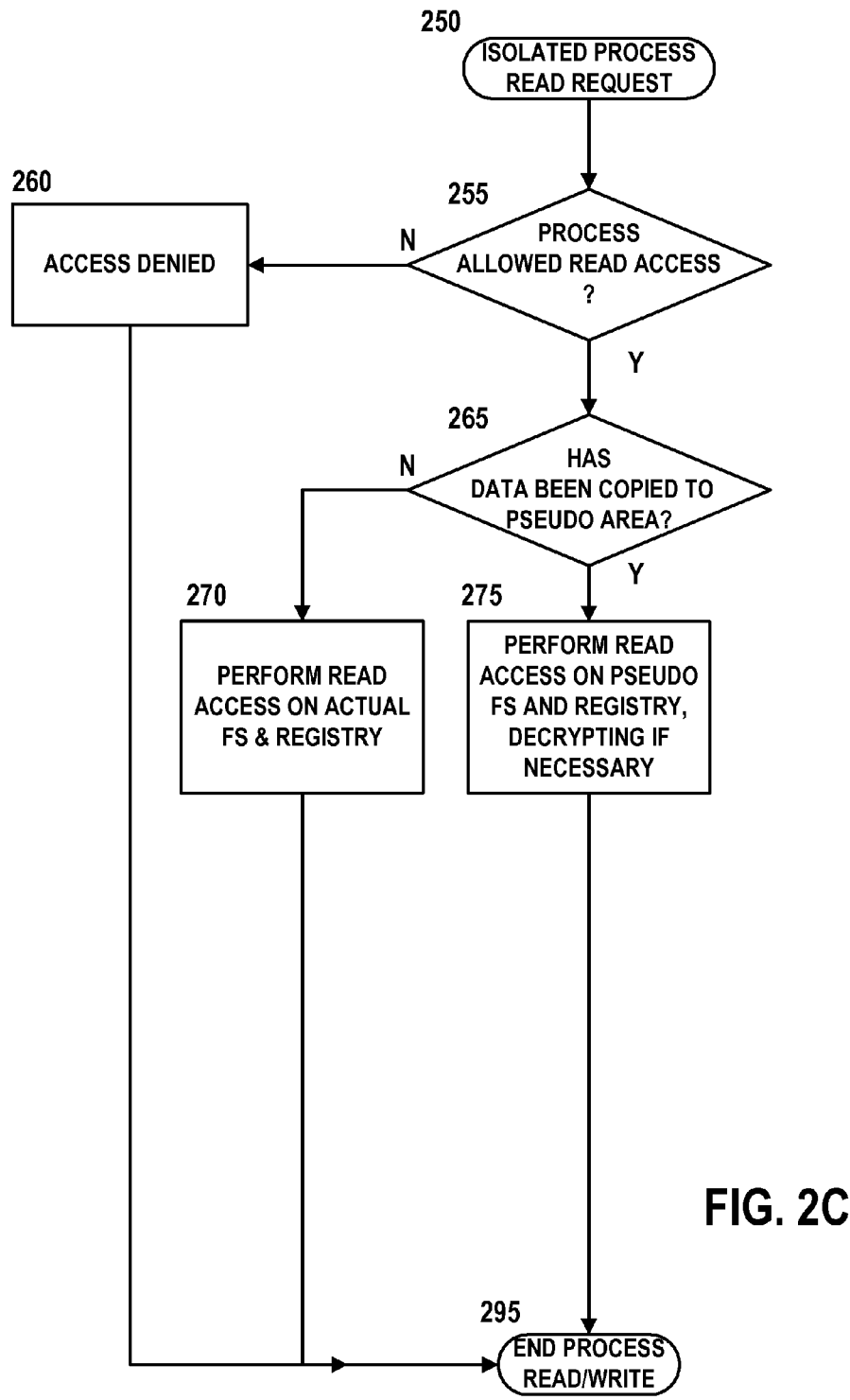
FIG. 2D is a flowchart illustrating a method for process termination.

FIG. 2B illustrates the process read/write procedure 200. When a process requests read or write access to the registry or file system, a test is performed to determine if the process is an isolated one 205, which may be done by checking the isolated process flag. If the process is not an isolated one, then the requested read/write access is performed normally 210, and the process read/write routine ends normally 295.

The handling of the request for an isolated process depends on whether the request is a read request or a write request. The software 80 determines the type of request 215. If it is a write request, then the software 80 determines if this is the first write request for this particular data 220. If it is, then the data associated with the write request is copied 225 from the actual file system 20 or registry 30 into the pseudo file system 40 or registry 50 respectively.

For file system requests, in one embodiment, the entire file is copied, and all subsequent read/write operations performed on the file are done in the pseudo file system 50 file. However, for large files, this may significantly slow down the initial write request. Therefore, in an embodiment, only some portion of the file is copied over, based on some predefined size. For example, the first write request on a file may trigger the copying of a 10 MB data chunk of the file to the pseudo file system 40. Any subsequent read/write operations within that 10 MB chunk of the file take place from/to the pseudo file system 40, whereas subsequent read operations outside of that 10 MB chunk take place from the actual file system 20.

The data is subsequently written to either the pseudo file system 40 or the pseudo registry 50. In one embodiment, the data is encrypted before it is written to the pseudo file system 40 or pseudo Windows Registry. This can prevent, e.g., malicious code that is downloaded with the browser, from being accessed by non-isolated processes. It is also possible to make the encryption as a selectable option. This provides an ability to control an isolated application's access to the "real" computer—i.e., encrypting the "pseudo" machine prevents it from seeing the real machine and vice versa, thereby thwarting viruses that might compromise users' passwords, contact list, and other private information. This design defeats a fundamental access mechanism a criminal hacker would try to use to gain access to a user's system. In addition to isolating the process, and the workspace, it also effectively "hides" the computer from assault.

For an isolated process read request 250 (FIG. 2C), in one embodiment, a check is performed 255 to see if the isolated process is allowed the type of read access requested. For example, a browser application may attempt to access a user's e-mail contacts list. However, the contact list may be indicated as a type of read access that is not permitted by isolated processes. In such a situation, access to the desired data is denied 260 and the read/write process ends 295. An error message could be generated and returned to the calling process. The list of information that a particular isolated process may access (or, conversely, not access) can also be provided in the registry 30 or in a file on the file system 20 and provided when the software 80 is installed. This list could vary depending on a particular username or user/group attribute.

The list may include list of directories, a list of wildcard delimited filenames that, disk drives, etc. to which access should be denied (or allowed). The list could include system files, a My Documents folder, the Outlook address book, etc. In this manner, unauthorized reads can be prevented.

If read access is allowed for the isolated process, then a determination is made as to whether the data has actually been copied to the pseudo area 265 (via either a previous write operation, or a preloading of preserved data). If it has not, then read access is permitted 270 on the actual file system 20 and registry 30. If it has, then read access is only permitted on the pseudo file system 40 and registry. If the data was encrypted when written, it is then decrypted prior to being provided to the calling isolated process 95.

Figure 2D:
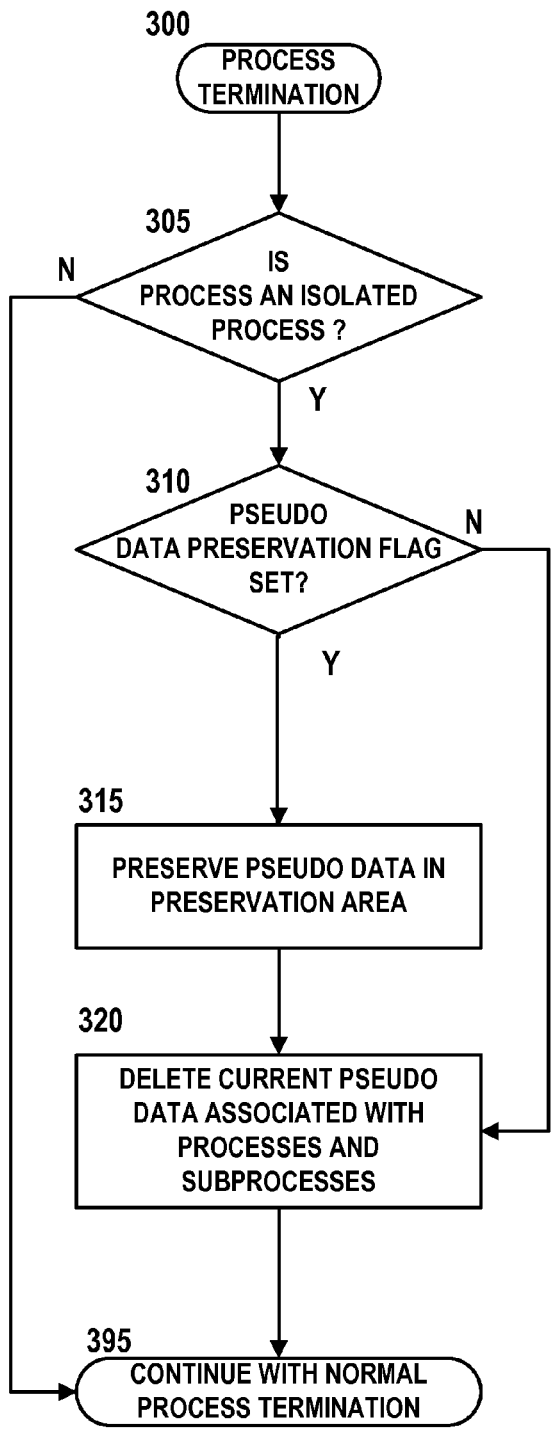

Process termination 300 is illustrated in FIG. 2D. In this embodiment, when a process terminates, the flag is checked 305 to determine if it is an isolated process 95. If it is not, then the system continues with normal process termination 395. If it is, a check is made to determine if a data preservation flag is set 310. Alternately, a user could be prompted to indicate whether the pseudo data should be preserved and made available for a subsequent instance of the application. If pseudo data preservation is indicated, then the pseudo data is preserved 315 in the preserved pseudo data storage area 60.

Subsequently, regardless of whether a choice was made to preserve the pseudo data or not, the current pseudo data associated with the terminating process (and any associated sub-processes) is deleted 320, and normal process termination 395 takes place.

It is also possible for the software 80 to determine if data has been compromised and then delete the preserved pseudo data 60 (or not allow preserving the pseudo data). Or, the user could be provided with an indication that the data has been compromised and ask if the user would still like to preserve or delete the preserved data. It may be possible to assess the risk threat detected by compromised data and take differing actions. For example, relatively benign adware downloaded on the system might not flag a deletion of preserved pseudo data 60, whereas a disk-destroying virus may require the deletion of preserved pseudo data 60—although such a virus poses no threat to non-isolated parts of the system, it could still harm data acquired within a session of a user executing isolated processes.

In one embodiment, the user may be asked whether to merge the pseudo data 40, 50 with the actual data 20, 30, although this option largely defeats its intended purpose, since a user is unlikely to know whether the pseudo data has been compromised or not.

In an embodiment, it is also possible to attempt to maintain integrity even within an isolated process or group of processes by utilizing encryption techniques at a low-level (e.g., socket communications, event processing, etc.) so that, e.g., a keystroke reading malware program downloaded via a web browser can not obtain, e.g., password information for a user accessing a bank account page. Preferably, this would be implemented via a kernel mode filter since this would be extremely difficult to thwart—however, this could also be handled in user mode, but a user mode implementation could be easier for a virus or malware to get around.

For Windows XP 32-bit and earlier Microsoft operating systems, accesses to the registry and file system can be implemented by the software 80 using a technique called "patching the kernel", which is an unsupported modification of the central component of Windows. In this scheme, for registry access, the Windows System Service Descriptor Table (SSDT) is opened, and all of the system application program interfaces (APIs) that perform registry access are identified. Then, for each interface, a patch is added that directs it to a routine of the software 80 that performs the requested registry access—either to the actual registry or to the pseudo registry. If necessary, the original access routine may be subsequently called, but this is often not necessary. Thus, a user mode process attempting to access a registry key via the kernel mode interface is actually accessing the patched registry access routines of the software. The Windows file I/O subsystem/APIs can be similarly patched so that file I/O requests are redirected to the software 80 routines.

The same mechanism cannot be used on Windows 64-bit platforms, due to Microsoft's implementation of Kernel Patch Protection (KPP), or PatchGuard, noted above. On this platform, any attempt to perform a patch to the descriptor table in this manner is detected by the OS, and causes the system to shut down. On Windows Vista and later versions of Microsoft's OSs, Microsoft's Registry Filtering Model (RFM) is utilized. This is described, in relevant part, in Jerry, Kelley, "Introduction to Registry Filtering in Vista (Part I), *The NT Insider*, Vol. 15, Issue 1, May 28, 2008).

The RFM provides a framework by which a driver can be developed that provides callbacks for registry IO that it's interested in. These callbacks are registered with the RFM and are called whenever specific registry IO is processed. All of the RFM interfaces that the driver uses are provided by the Configuration Manager (CM). In addition to managing the callbacks, the RFM also provides for three types of contexts that a driver can use to associate private information with an object or operation.

The software 80 implemented on 64-bit architectures comprise both a file system and a registry filter driver (although this model described below will also work on a 32-bit architecture). Those are actually two different binary modules in kernel mode. One of them is the file system which is a standalone full file system implementation. The other is a filter driver which actually registers with this RFM framework. Thus, the software registers various callback routines.

As registry access occurs from different processes in user mode, a respective callback is notified. For example, when a registry key is being opened, the callback routine is notified that an open on a specific key is happening, and receives its name, type of access that the user wants, etc. In isolated processes, such notifications are captured, and then redirect off to a virtual registry instead of allowing them to access the real registry.

File system isolation may be achieved through a file system filter driver which ensures that nothing in the underlying name space is modified by an isolated process. This may be implemented using Microsoft's Minifilter Driver architecture (see, MSDN File System Minifilter Drivers and subchapters, build date Sep. 28, 2010), which is a model for implementing file system filters. The presently implemented filter driver implements both the filtering for the file system and for the registry filtering.

Isolated processes go through a re-parsing in which filenames get reconstructed. By way of example, if the user in an isolated process wishes to access C:\foo.txt, when the file was created, the file system also created a named device object (see MSDN (Microsoft Developer's Network) Library, Named Device Objects, (and associated subchapters) build date Sep. 21, 2010). The name is reconstructed and then sent to that file system instance. A special status code is returned back to the system I/O manager. The I/O manager sees this status code and recognizes that a caller to redirect this open access, so it re-parses the name and it sends it over to the file system routines of the software 80. Thus, the software 80 leverages the Windows redirection functions.

The rebuilding of the filename and returning the special status code indicates that the I/O manager should re-parse the file name, and send the request to a location with a new name. In NTFS, directory and file symbolic links can be set. By way of example, if an isolated process attempted to write to c:\dir, this could be set as a re-parse point that actually points to e:\isolated_dir for the actual write, even though the process believes it is writing to c:\dir. So at the heart of the I/O manager, the redirection occurs, and the process is unaware that it has been redirected.

The isolation of a process preferably include named pipes, mail slots, remote procedure call (RPC), local procedure call (LPC), and sockets. All methods for modifying the environment can be handled to ensure complete isolation of the given process. In this implementation, channel access is monitored for an isolated process and appropriate action is taken depending on the type of access request is being made, the port on which it is to be performed, etc.

Named pipes may be filtered by using a legacy based filter driver attaching to the "Named Pipe File System", or NPFS. Named pipes are used for inter-process communication and this avenue for an isolated process group to leak information outside of the isolated process group is closed in an embodiment of the invention. The named pipe names are mangled such that inter-process communication within an isolated process group is supported but when named pipes are used for communication outside of the isolated process group they are blocked.

The pipe names are always mangled for isolated processes in the same manner. In contrast, pipe names for non-isolated processes are not mangled. Thus, for processes within a process group, their pipe names are mangled in the same way and thus they are oblivious to (or not aware of) the name mangling. But a process outside of the process group does not know about the name mangling and thus will not be able to access a named pipe opened by an isolated process. The same holds true for an isolated process attempting to open a named pipe created by a non-isolated process—the name opened by the isolated process would be mangled and thus would fail to open the non-isolated process named pipe.

Network sockets may be filtered within the kernel mode framework for isolated process groups to control how the isolated process group processes access networks resources. This is accomplished by using the kernel mode module for filtering socket creation and access. The determination of whether to allow connections to external network resources is mandated by policies setup during initial configuration of the system software.

Other network resources such as shared network storage, network printers and other resources shareable over a network connection should be denied access from within an isolated process group. File system access for system libraries may be controlled such that, for an isolated process group, any request to modify, delete, or overwrite a system library is denied. File system access control for system libraries may be implemented through a file system filter driver.

The Local Procedure Call, or LPC, interface may be controlled for isolated process groups. This control can be implemented through a filtering mechanism which utilizes the previously described security descriptor which is attached to isolated processes within an isolated process group. LPC requests for isolated process groups made to non-isolated processes are controlled or denied based upon the type of request made. A typical example which uses LPC communication is installer packages or any module which would need to be executed in a controlled environment. In this case, an LPC call is made to a system service to run a given application located at a specific location. In an embodiment of the invention, we can filter these LPC calls and modify the location of the executable which is to be executed.

The Remote Procedure Call, or RPC, interface may be controlled for isolated process groups. This control is implemented through a file system filter driver and any RPC request from an isolated process group is denied.

All requests which are isolated for a given process should be redirected to a name space, registry location, or necessary pseudo area for persistent storage. This storage can then later be used to launch the isolated process so that it can resume within the environment that it had previously modified. The user can be provided with the option at the time an isolated process ends to destroy all history of the process, allowing for a clean initialization the next time the process is launched.

One major challenge in the implementation was recognizing operations that are requested by isolated processes, yet are actually carried out inside of a server process. For example, certain file system accesses are sent from the original process through an LPC channel and the file system APIs are actually called by a server process such as csrss, lsass, svchost, etc.

When the file system filter sees these requests, it looks at the calling process and sees the server, not the client. However, the server is handling a combination of requests from both isolated and non-isolated processes and thus cannot be marked as isolated a priori.

A process-based recognition strategy is not enough to deal with these client-server cases. In order to ensure that a server process is not performing operations that are illegal for the client process, the client process passes its token along with the request. The server process then enters an impersonation mode where it takes on the identity and privileges of the client and is thus guaranteed to be limited to whatever the client itself would normally be allowed to access.

This token/impersonation scheme can be utilized by overloading some of the information within an isolated client process token. Every token has a DACL that enumerates pairings of access-type and identity to allow or disallow various rights to certain users. A special access control entry (ACE) can be added to this DACL which can then be recognized by the filter when it is handling requests coming from server processes.

The custom ACE that is built may be a concatenation of a special and specific globally unique identifier (GUID) (in order to avoid collisions with real user identities) and the process group that this particular application is a member of. For each request coming in to the filter, if it is not possible to determine the isolation status through normal process tracking, then the DACL can be scanned for this special ACE. If a matching ACE is found, the isolation process group is extracted and the request is treated as isolated. If no matching ACE is found then the request is treated as non-isolated. An additional benefit of using this strategy is that the process token is automatically inherited by new child processes. Therefore, the existing semantics of having all children of an isolated process remain isolated still hold.

A user mode DLL may be used for patching the import and export tables for isolated process groups. This user mode patching may be performed for 32- and 64-bit isolated processes. Note that this is different from attempting to patch kernel mode components to override specific functionality, which is prohibited in the Windows 64-bit operating systems. User mode binaries can be patched without problems on 32- and 64-bit systems, and patching user mode binaries is not restricted in the same manner as patching kernel mode components, and can be performed without problems.

The user mode patching allows for control of isolated processes from performing calls into system APIs which could allow the isolated process to modify, control or terminate a non-isolated process.

The APIs which are patched in the above user mode DLL include any which would allow the isolated process, or any process within the isolated process group, from opening a non-isolated process and accessing memory, handles, message queues, internal queues, window based frameworks or any additional access point which could allow the isolated process to modify, control or terminate the non-isolated process.

The above mechanism may also be used to control access for isolated process groups requesting COM requests to/from non-isolated processes.

The system is preferably implemented as a full-fledged file system such as NTFS or FAT—not an unnamed file system, hidden in Kernel Mode. Such a file system can thus provide the functionality described below.

The system provides isolation from and may be different in structure, access methods, and characteristics from NTFS and FAT. Preferably, the only commonality to NTFS and FAT is that they are file systems. NTFS and FAT talk directly to the disk, whereas the present file system should be a file system that talks to NTFS and FAT instead of talking to the disk. NTFS and FAT have a goal of data integrity, whereas the present goal is process isolation. Thus, the file system driver (FSD) is implemented to provide isolation for underlying files.

Thus, a file aspect is that normal utilities can work on a "pseudo" directory looking for signatures. A registry aspect provides that if one is not running inside of an isolated process—the keys can be seen, but they don't make any sense nor will they be in the right place to do something wrong or corrupt.

A process group can be created, which is a group of processes like the parent process and child processes that all have a consistent view of the system and its processes. Outside of this group, changes cannot be set that are made by the isolated processes. A process can be added to a process group, such as a scanner, and it could scan and see the changes. This would permit a clean pseudo file directory, which could then be merged back into the registry. Thus, it is possible to run everything isolated so that there is consistency in registry changes if committing the changes to the registry.

The registry filter is a Kernel model component that provides the registry isolation. The registry filter assures that registry changes are written to the pseudo registry area and not the actual registry area, and also redirects calls to the pseudo area so that system operates as though the changes had in fact been made to the registry. When a process launches, the filter intercepts references to the Kernel, and redirects to the pseudo area, for both write and read. Advantageously, this system has true redirection: if a key is being read it is going to the real registry. Thus, the present implementation sits above the file system and works on a registry key and value, and operates on a per file system basis, having a fine level of detail, permitting specific knowledge of what is happening to every single file.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A method for protecting a computer system, comprising:
    attaching a security descriptor to a process running on a processor of the computer system that has been previously started;
    associating with the security descriptor an isolation indicator that, by itself, indicates the process is to run in an isolation mode, thereby rendering it as an isolated process, the isolated process running with non-isolated processes in a common environment;
    calling a kernel routine by the isolated process that is also callable by a non-isolated process that is not running in isolation mode;
    attempting to write to an object of a disk or a registry by the kernel routine called by the isolated process;
    determining, by a filter driver running in kernel mode, whether the kernel routine is requesting the write on behalf of the isolated process or the non-isolated process;
    if the write is requested on behalf of the isolated process, then performing the write in a pseudo storage area; and
    if the write is requested on behalf of the non-isolated process, then performing the write in an actual storage area in which the disk, registry, or other actual system or process data resides;
    wherein if the requested write is a first object write, then copying the object from the actual storage area to the pseudo storage area;
    assigning a first process group to the isolated process;
    creating an additional group process within the first process group;
    performing a first determination by an application programming interface (API) that the additional group process is within the first process group, and as a result of the first determination, causing the additional group process to inherit and duplicate a handle of the isolated process.

2. The method according to claim 1, further comprising:
    assigning a second process group to a third process that is separate from the first process group;
    performing a second determination by the API that the third process is not within the first process group, and as a result of the determination, filtering or adjusting the inheritance and duplication of a handle of the isolated process to remove any access that allows the process to modify, control, or terminate the third process.

3. The method according to claim 2, wherein the handle inheritance and duplication filtering or adjusting is performed on a per-process and per-thread basis.

4. A method for protecting a computer system, comprising:
    attaching a security descriptor to a process running on a processor of the computer system that has been previously started;
    associating with the security descriptor an isolation indicator that, by itself, indicates the process is to run in an isolation mode, thereby rendering it as an isolated process, the isolated process running with non-isolated processes in a common environment;

calling a kernel routine by the isolated process that is also callable by a non-isolated process that is not running in isolation mode;

attempting to write to an object of a disk or a registry by the kernel routine called by the isolated process;

determining, by a filter driver running in kernel mode, whether the kernel routine is requesting the write on behalf of the isolated process or the non-isolated process;

if the write is requested on behalf of the isolated process, then performing the write in a pseudo storage area; and if the write is requested on behalf of the non-isolated process, then performing the write in an actual storage area in which the disk, registry, or other actual system or process data resides;

wherein if the requested write is a first object write, then copying the object from the actual storage area to the pseudo storage area;

utilizing a communication element that allows inter-process communication between the isolated process and an other isolated process within a first process group, but blocks inter-process communication between the isolated process and a further process that is not within the first process group.

5. The method according to claim 4, wherein the communication element is named pipes, and names of the pipes are mangled in a same manner for the isolated process and the other isolated process with the first process group.

6. The method according to claim 4, wherein the communication element is network sockets, and a kernel mode module is used for filtering socket creation and access according to policies set up during initial configuration of the system software.

7. The method according to claim 4, wherein access to network shareable resources are denied access by the isolated process.

8. The method according to claim 7, wherein the network shareable resources are selected from the group consisting of shared network storage and network printers.

9. The method according to claim 4, wherein the communication element is a local procedure call, the method further comprising controlling a local procedure call interface utilizing the security descriptor attached to the isolated process.

10. The method according to claim 9, wherein a local procedure call made to a non-isolated process is controlled or denied based on a type of request made.

11. The method according to claim 4, wherein the communication element is a remote procedure call, the method further comprising denying a remote procedure call from the isolated process to a process that is not within the first process group.

12. A method for protecting a computer system, comprising:

attaching a security descriptor to a process running on a processor of the computer system that has been previously started;

associating with the security descriptor an isolation indicator that, by itself, indicates the process is to run in an isolation mode, thereby rendering it as an isolated process, the isolated process running with non-isolated processes in a common environment;

calling a kernel routine by the isolated process that is also callable by a non-isolated process that is not running in isolation mode;

attempting to write to an object of a disk or a registry by the kernel routine called by the isolated process;

determining, by a filter driver running in kernel mode, whether the kernel routine is requesting the write on behalf of the isolated process or the non-isolated process;

if the write is requested on behalf of the isolated process, then performing the write in a pseudo storage area; and if the write is requested on behalf of the non-isolated process, then performing the write in an actual storage area in which the disk, registry, or other actual system or process data resides;

wherein if the requested write is a first object write, then copying the object from the actual storage area to the pseudo storage area;

providing a user mode library for patching import and export tables for isolated process groups to control the isolated process from performing calls into system application program interface routines that could allow the isolated process from modifying, controlling, or terminating the non-isolated process or a process from a different process group.

* * * * *